(12) United States Patent
Santini-Scampucci et al.

(10) Patent No.: US 9,005,556 B2
(45) Date of Patent: Apr. 14, 2015

(54) PROCESS FOR SEPARATING ZIRCONIUM AND HAFNIUM TETRACHLORIDES FROM MIXTURES

(75) Inventors: Catherine Santini-Scampucci, Collonges au Mont d'Or (FR); Yves Chauvin, Tours (FR); Paul Campbell, Bochum (DE)

(73) Assignee: Centre National de la Recherche Scientifique, Paris (FR)

( * ) Notice: Subject to any disclaimer, the term of this patent is extended or adjusted under 35 U.S.C. 154(b) by 26 days.

(21) Appl. No.: 13/813,696

(22) PCT Filed: Aug. 2, 2011

(86) PCT No.: PCT/FR2011/051863
§ 371 (c)(1),
(2), (4) Date: Mar. 22, 2013

(87) PCT Pub. No.: WO2012/017181
PCT Pub. Date: Feb. 9, 2012

(65) Prior Publication Data
US 2013/0177488 A1    Jul. 11, 2013

(30) Foreign Application Priority Data

Aug. 2, 2010    (FR) .................................... 10 03230

(51) Int. Cl.
| | | |
|---|---|---|
| *B01D 11/00* | (2006.01) | |
| *C22B 3/20* | (2006.01) | |
| *C01G 25/00* | (2006.01) | |
| *C01G 25/04* | (2006.01) | |
| *C01G 27/00* | (2006.01) | |
| *C01G 27/04* | (2006.01) | |
| *C22B 3/42* | (2006.01) | |
| *C22B 34/14* | (2006.01) | |

(52) U.S. Cl.
CPC ............... *C22B 3/20* (2013.01); *C01G 25/003* (2013.01); *C01G 25/04* (2013.01); *C01G 27/003* (2013.01); *C01G 27/04* (2013.01); *C22B 3/42* (2013.01); *C22B 34/14* (2013.01); *C01P 2002/86* (2013.01)

(58) Field of Classification Search
None
See application file for complete search history.

(56) References Cited

U.S. PATENT DOCUMENTS

| | | | |
|---|---|---|---|
| 2,816,814 A | | 12/1957 | Plucknett |
| 2,892,681 A | | 6/1959 | Crandall et al. |
| 3,006,719 A | * | 10/1961 | Miller .............................. 423/70 |
| 3,395,976 A | | 8/1968 | Glemser |
| 3,658,466 A | * | 4/1972 | Otsuka ........................... 423/70 |
| 4,231,994 A | | 11/1980 | MacDonald |
| 5,176,878 A | * | 1/1993 | Sarbeck et al. ................. 423/70 |
| 6,737,030 B2 | * | 5/2004 | Sommers et al. ............... 423/70 |
| 7,708,962 B2 | * | 5/2010 | Delons et al. ................... 423/70 |
| 2004/0011739 A1 | | 1/2004 | Ozanne et al. |
| 2009/0265800 A1 | | 10/2009 | Schultze |

FOREIGN PATENT DOCUMENTS

| | | |
|---|---|---|
| FR | 2250707 A1 | 6/1975 |
| GB | 1 442 229 A | 7/1976 |

OTHER PUBLICATIONS

International Search Report, dated Nov. 2, 2011, from corresponding PCT application.
Fausto Calderazzo et al., "Eta6-Arene derivatives of titanium (IV), zirconium (IV) and hafnium(IV)", Journal of Organometallic Chemistry, Jul. 12, 1996, pp. 189-196, vol. 518, No. 1.

\* cited by examiner

*Primary Examiner* — Steven Bos
(74) *Attorney, Agent, or Firm* — Young & Thompson

(57) ABSTRACT

A simple, inexpensive and non-corrosive industrial separation method making it possible to separate zirconium and hafnium tetrachlorides from mixtures thereof, a simple industrial method allowing the zirconium/hafnium separation, and a method making it possible to produce fractions enriched with zirconium and containing hafnium at a trace level are disclosed.

15 Claims, 1 Drawing Sheet

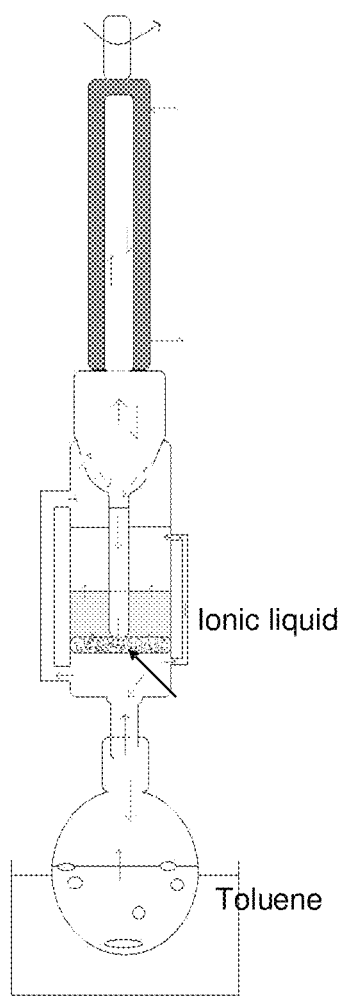

PROCESS FOR SEPARATING ZIRCONIUM AND HAFNIUM TETRACHLORIDES FROM MIXTURES

BACKGROUND OF THE INVENTION

1. Field of the Invention

The present invention relates to a method for separating zirconium and hafnium tetrachlorides from mixtures thereof as obtained by the direct chlorination of their ores.

2. Description of the Related Art

Zirconium ores such as zirconia contain hafnium in proportions of between 1 and 3% but which can reach 20%. Needles made of zirconium or its alloys which contain, for example, uranium and/or plutonium oxides in nuclear reactors require that hafnium, which has the property of strongly absorbing neutrons, be removed as completely as possible. Most often the hafnium content must be less than 200 ppm, or even 100 ppm. And conversely, in certain parts of reactors (moderators) the hafnium content of the zirconium must be less than 4.5%.

The zirconium and hafnium compounds have very similar physical and chemical properties; the separation methods proposed are numerous. Those which are used industrially include liquid-liquid or aqueous extraction (N. Ozanne, M. L. Lemaire, A. Guy, J. Foos, S. Pellet-Rostaing, F. Chitry, WO, Compagnie Européenne du Zirconium Cezus, Fr., 20010910. 2002, 23 pp.; Oriel, L.; Favre-Reguillon, A.; Pellet-Rostaing, S.; Lemaire, M. Zirconium and hafnium separation, Part 1. Liquid/liquid extraction in hydrochloric acid aqueous solution with Aliquat 336. Separation Science and Technology (2006), 41(9), 1927-1940.). The fractional crystallization of aqueous solutions of fluorozirconate (A highly efficient method for separation of zirconium and hafnium. Ogarev, Vadim; Skotnicki, Antek; Ninham, Barry. (Australia). Aust. Pat. Appl. (2009), 12 pp. CODEN: AUXXCM AU 2008202451 A1 20090108) and of alkaline fluorohafnates or the extractive distillation of the chlorides using an alkaline chloroaluminate at around 360° C. (L. Delons, G. Picard, D. Tigreat, Compagnie Européenne Du Zirconium Cezus, WO 20020412. 2002, 20 pp.; [L. Delons, S. Lagarde, A. Favre Reguillon, S. Pellet Rostaing, M. Lemaire, L. Poriel, Compagnie Européenne du Zirconium-Cezus, Fr.) Fr 2004-7721 2006, 40.). Although selective, these methods suffer from various drawbacks. Thus, the effective extraction of an aqueous phase with methyl ethyl ketone leads to the hydrolysis of the chlorides to oxychlorides that then have to be re-chlorinated in order to allow their reduction with magnesium, for example. The second is costly in terms of labour, investment, reagents and energy. Finally the third, although simpler, is carried out at temperatures so high that it leads to considerable corrosion requiring frequent changes of the trays and internal components of the distillation column.

It is well known that, with the Lewis acids, the most studied of these undoubtedly being aluminium chloride, the aromatic hydrocarbons form arenium complexes the stability of which is all the greater the more basic the aromatic, for example when it contains a higher number of methyl groups. This is also the case with the zirconium and hafnium tetrachlorides. But in these latter cases hexamethyl benzene, taken as an example, reacts with zirconium tetrachloride in order to produce a binuclear molecular complex of formula $Zr(\eta^6\text{-}Me_6C_6)Cl_2(\mu\text{-}Cl)_3ZrCl_3$ (F. Musso, E. Solari, C. Floriani, K. Schenk, Organometallics 1997, 16, 4889) whereas hafnium tetrachloride leads to a binuclear ionic complex of formula $[Hf(\eta^6\text{-}Me_6C_6)Cl_3]^+[Hf_2Cl_9]^-$ (F. Calderazzo, I. Ferri, G. Pampaloni, S. Troyanov, J. Organomet. Chem. 1996, 518, 189; F. Calderazzo, P. Pallavicini, G. Pampaloni, P. F. Zanazzi, J. Chem. Soc., Dalton Trans. 1990, 2743).

At present there is no method that is effective, inexpensive and takes place at temperatures low enough not to result in corrosion.

SUMMARY OF THE INVENTION

One of the aspects of the invention is to propose an industrial separation method that is simple, inexpensive and non-corrosive, making it possible to separate zirconium and hafnium tetrachlorides from mixtures thereof.

Another aspect of the invention is to propose a simple industrial method allowing the zirconium/hafnium separation.

Another aspect of the invention is to propose a method making it possible to produce fractions rich in zirconium and containing hafnium at a trace level.

It has been possible to achieve these different aspects by the implementation of a liquid-liquid extraction in the strict absence of water at a temperature below 100° C. using ionic liquids, which on the one hand avoids corrosion problems and on the other hand makes it possible to directly recover the zirconium and hafnium in the form of chlorides, with the desired degree of purity.

More precisely, a subject of the invention is therefore the use of an ionic liquid, the melting point of which is below 100° C., and having a non-nucleophilic anion, under anhydrous conditions, for the implementation of a method for separating hafnium tetrachloride and zirconium tetrachloride, starting from a mixture of Zr tetrachloride/aromatic compound and Hf tetrachloride/aromatic compound complexes, by liquid-liquid extraction, with a Zr/Hf enrichment of at least 100/1 (expressed by mass relative to the abovementioned complexes).

The Inventors have surprisingly found that the liquid-liquid extraction using an ionic liquid made it possible to completely separate the two respective Zr tetrachloride/aromatic compound and Hf tetrachloride/aromatic compound complexes, thus making industrial-scale separation possible in a single step.

In fact, in spite of the knowledge of the molecular nature of the Zr tetrachloride/aromatic compound complex and of the ionic nature of the Hf tetrachloride/aromatic compound complex, these two complexes had never been brought into contact in an ionic liquid and a fortiori the behaviour of this mixture in such a medium could not be predicted.

The anion of the ionic liquid used is non-nucleophilic so as not to modify the structure of the complexes formed.

According to an aspect of the invention, the abovementioned mixture of complexes originates from the reaction of an aromatic compound with a starting mixture of $ZrCl_4$ and $HfCl_4$.

According to another aspect, this starting mixture can originate from the carbochlorination of the zircon ore, which usually contains an Hf/Zr weight percentage ratio of 1/99 to 3/97. This starting mixture of $ZrCl_4$ and $HfCl_4$ may have been subjected to one or more treatments intended to remove certain metals or impurities.

According to an advantageous embodiment of the invention, the liquid-liquid extraction is carried out with a hydrocarbon or a mixture of hydrocarbons.

In other words, the liquid-liquid extraction on the one hand involves "ionic liquids" i.e. pairs of ions the melting point of which is below 100° C. and on the other hand hydrocarbons or mixtures of hydrocarbons, these two types of liquids being chosen so as not to be very miscible with each other and preferably immiscible with each other, in order to allow the formation of two phases: an ionic liquid phase and a hydrocarbon phase.

According to another advantageous embodiment of the invention, the temperature at which the separation method is carried out is less than approximately 100° C., and is in particular approximately 15° C. to approximately 35° C.

The possibility of working at a temperature within a range of values corresponding to ambient temperature avoids corrosion problems.

According to an advantageous embodiment of the invention, the aromatic compound respectively involved in the two respective Zr tetrachloride/aromatic compound and Hf tetrachloride/aromatic compound complexes corresponds to the following formula:

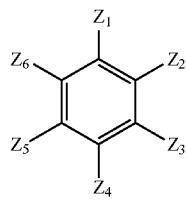

in which $Z_1$, $Z_2$, $Z_3$, $Z_4$, $Z_5$ and $Z_6$ represent independently of each other:
 a hydrogen atom,
 a linear or branched alkyl containing from 1 to 20 in particular from 1 to 12 carbon atoms, or
 an aryl.

The aromatic compound advantageously used in the invention is hexamethylbenzene which can be replaced by any other aromatic such as toluene, the xylenes, the tetramethyl benzenes, pentamethylbenzene.

The aromatic compound is such that it is capable of producing a binuclear ionic hafnium complex of formula $[Hf(\eta^6\text{-}Me_6C_6)Cl_3]^+[Hf_2Cl_9]$ and a binuclear molecular compound of formula $Zr(\eta^6\text{-}Me_6C_6)Cl_2(\mu\text{-}Cl)_3ZrCl_3$ starting from a mixture of hafnium and zirconium tetrachloride.

The mixture of Zr tetrachloride/aromatic compound and Hf tetrachloride/aromatic compound complexes can be either in solution in a solvent such as toluene or in the form of a solid composition.

According to an advantageous embodiment of the invention, the ionic liquid is a mixture, in particular stoichiometric, of one or more ammonium chlorides and one or more metal chlorides.

The mixture defined previously is advantageously a stoichiometric mixture.

There is no benefit in utilizing an excess of Lewis acid which would enter into competition with the hydrocarbon, nor an excess of base which would enter into competition with the Lewis acid, hence the use of "neutral" stoichiometric compounds. In other words, the use of an ionic liquid with a non-nucleophilic anion is necessary according to what has been said previously.

According to an advantageous embodiment of the invention, in the ionic liquids used the metal chloride or chlorides are chosen from aluminium trichloride, zinc chloride, zirconium tetrachloride, hafnium tetrachloride, ferrous chloride, ferric chloride, cuprous chloride, cupric chloride, cuprous chloride, titanium tetrachloride, cadmium trichloride, cobalt dichloride, tin dichloride, tin tetrachloride, antimony trichloride or mixtures thereof.

According to an advantageous embodiment of the invention, in the ionic liquids used, the ammonium chloride or chlorides of are chosen from:
 the compounds corresponding to general formula $NR1R2R3^+Cl^-$, R1, R2, and R3 being linear or branched C1-C20 aliphatic groups
 the C5-C12 or aromatic cycloalkanes,
 the heterocyclic chlorides such as pyridine and the substituted pyridines,
 the dipyridyls,
 the mono-, di- or trisubstituted imidazolium chlorides,
 the benzimidazoliums and substituted benzimidazoliums,
 the triazoliums and substituted triazoliums,
 the piperadiziniums and substituted piperadiziniums,
 the pyrrolidiniums and substituted pyrrolidiniums,
 the oxazolidiniums and substituted oxazolidiniums,
 the morpholiniums and substituted morpholiniums,
 the guanidiniums and substituted guanidiniums,
 the thiazoliums and substituted thiazoliums,
 the phosphonium chlorides and substituted phosphonium chlorides,
 any other nitrogen- or phosphorus-containing heterocycle optionally also containing oxygen or sulphur atoms, and
 mixtures thereof.

According to an advantageous embodiment of the invention, the ionic liquid is a stoichiometric mixture of methylbutylimidazolium chloride and aluminium chloride.

According to an advantageous embodiment of the invention, the liquid-liquid extraction is carried out with a hydrocarbon chosen from:
 linear or branched alkanes with 4 to 12 carbon atoms,
 cycloalkanes and substituted cycloalkanes with 5 to 12 carbon atoms,
 aromatics substituted by alkyl and/or cycloalkyl chains, the alkyl radicals having 1 to 12 carbon atoms and
 mixtures thereof.

The liquid-liquid extraction involved in the invention is carried out by the addition of an ionic liquid to the mixture of Zr tetrachloride/aromatic compound and Hf tetrachloride/aromatic compound complexes. When the abovementioned mixture of complexes is in the form of a solid composition, the addition to the latter of the ionic liquid leads to an anhydrous solution being obtained.

The invention therefore also relates to an anhydrous solution comprising:
 an ionic liquid, the melting point of which is below 100° C., and
 a mixture of Zr tetrachloride/aromatic compound and Hf tetrachloride/aromatic compound complexes, in solution in said ionic liquid.

According to an advantageous embodiment of the invention, in the complexes defined above which form part of the anhydrous solution, the aromatic compound corresponds to the following formula:

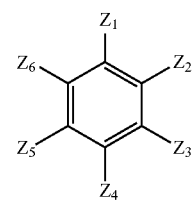

in which $Z_1$, $Z_2$, $Z_3$, $Z_4$, $Z_5$ and $Z_6$ represent independently of each other:

a hydrogen atom,
an alkyl containing from 1 to 20, in particular from 1 to 12 carbon atoms, or
an aryl.

According to another advantageous embodiment of the invention, in the anhydrous solution, the ionic liquid is a mixture, in particular stoichiometric, of one or more ammonium chlorides and one or more metal chlorides.

According to an advantageous embodiment of the invention, in the anhydrous solution the metal chloride or chlorides in the ionic liquid are chosen from aluminium trichloride, zinc chloride, zirconium tetrachloride, hafnium tetrachloride, ferrous chloride, ferric chloride, boron trichloride, gallium trichloride, cupric chloride, cuprous chloride, titanium tetrachloride, cadmium trichloride, cobalt dichloride, tin dichloride, tin tetrachloride, antimony trichloride or mixtures thereof.

According to an advantageous embodiment of the invention, in the anhydrous solution the ammonium chloride or chlorides in the ionic liquid are chosen from:
- the compounds corresponding to general formula NR1R2R3$^+$Cl$^-$, R1, R2, and R3 being linear or branched aliphatic groups with 1 to 20 carbon atoms
- the C5-C12 or aromatic cycloalkanes,
- the heterocyclic chlorides such as pyridine and the substituted pyridines,
- the dipyridyls,
- the mono-, di- or trisubstituted imidazolium chlorides,
- the benzimidazoliums and substituted benzimidazoliums,
- the triazoliums and substituted triazoliums,
- the piperadiziniums and substituted piperadiziniums,
- the pyrrolidiniums and substituted pyrrolidiniums,
- the oxazolidiniums and substituted oxazolidiniums,
- the morpholiniums and substituted morpholiniums,
- the guanidiniums and substituted guanidiniums,
- the thiazoliums and substituted thiazoliums,
- the phosphonium chlorides and substituted phosphonium chlorides,
- any other nitrogen- or phosphorus-containing heterocycle optionally also containing oxygen or sulphur atoms, and mixtures thereof.

These compounds can optionally be carriers of various functions, alcohols, acids, amines etc.

According to an advantageous embodiment of the invention, in the anhydrous solution, the ionic liquid is a stoichiometric mixture of methylbutylimidazolium chloride and aluminium chloride.

When the ionic liquid has been added to the mixture of Zr tetrachloride/aromatic compound and Hf tetrachloride/aromatic compound complexes, and the latter is presented in the form of a solid composition, the hydrocarbon is added in order to carry out the liquid-liquid extraction. This hydrocarbon can also be added simultaneously with the addition of the ionic liquid.

When the mixture of Zr tetrachloride/aromatic compound and Hf tetrachloride/aromatic compound complexes is in solution in a solvent, the latter can be either evaporated off, which comes down to the previous case, or the presence of the latter can be maintained. In the latter case, the ionic liquid is added to a solution which can already contain a hydrocarbon.

In all these cases an anhydrous reaction mixture is obtained.

The invention therefore relates to an anhydrous reaction mixture comprising:
- an ionic liquid, the melting point of which is below 100° C.,
- a hydrocarbon or a mixture of hydrocarbons, and
- a mixture of Zr tetrachloride/aromatic compound and Hf tetrachloride/aromatic compound complexes, the Zr tetrachloride/aromatic compound complex: $Zr(Ar)Cl_2(\mu\text{-}Cl)_3ZrCl_3$, (Ar representing an aromatic) being in the hydrocarbon or the mixture of hydrocarbons, and the Hf tetrachloride/aromatic compound complex: $[Hf(Ar)Cl_3]^+[Hf_2Cl_9]$ being in the ionic liquid.

According to an advantageous embodiment of the invention, in the complexes defined above which are contained in the anhydrous solution, the aromatic compound corresponds to the following formula:

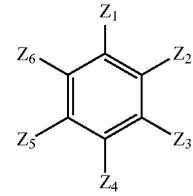

in which $Z_1$, $Z_2$, $Z_3$, $Z_4$, $Z_5$ and $Z_6$ represent independently of each other:
a hydrogen atom,
an alkyl containing from 1 to 20, in particular from 1 to 12 carbon atoms, or
an aryl.

According to another advantageous embodiment of the invention, in the anhydrous solution, the ionic liquid is a mixture, in particular stoichiometric, of one or more ammonium chlorides and one or more metal chlorides According to an advantageous embodiment of the invention, in the anhydrous solution, the metal chloride or chlorides in the ionic liquid are chosen from aluminium trichloride, zinc chloride, zirconium tetrachloride, hafnium tetrachloride, ferrous chloride, ferric chloride, boron trichloride, gallium trichloride, cupric chloride, cuprous chloride, titanium tetrachloride, cadmium trichloride, cobalt dichloride, tin dichloride, tin tetrachloride, antimony trichloride or mixtures thereof.

According to an advantageous embodiment of the invention, in the anhydrous solution the ammonium chloride or chlorides in the ionic liquid are chosen from:
- the compounds corresponding to general formula NR1R2R3$^+$Cl$^-$, R1, R2, and R3 being linear or branched aliphatic groups with 1 to 20 carbon atoms,
- the cycloalkanes or aromatics, with 5 to 12 carbon atoms,
- the heterocyclic chlorides such as pyridine and the substituted pyridines, the dipyridyls,
- the mono-, di- or trisubstituted imidazolium chlorides,
- the benzimidazoliums and substituted benzimidazoliums,
- the triazoliums and substituted triazoliums,
- the piperadiziniums and substituted piperadiziniums,
- the pyrrolidiniums and substituted pyrrolidiniums,
- the oxazolidiniums and substituted oxazolidiniums,
- the morpholiniums and substituted morpholiniums,
- the guanidiniums and substituted guanidiniums,
- the thiazoliums and substituted thiazoliums,
- the phosphonium chlorides and substituted phosphonium chlorides
- any other nitrogen- or phosphorus-containing heterocycle optionally also containing oxygen or sulphur atoms, and mixtures thereof.

According to an advantageous embodiment of the invention, in the anhydrous solution, the ionic liquid is a stoichiometric mixture of methylbutylimidazolium chloride and aluminium chloride.

According to an advantageous embodiment of the invention, the solvent involved in the liquid-liquid extraction is a hydrocarbon or a mixture of hydrocarbons in particular chosen from:
- linear or branched alkanes, with 1 to 20 carbon atoms
- cycloalkanes with 5 to 12 carbon atoms and substituted cycloalkanes,
- aromatics substituted by alkyl and/or cycloalkyl chains, the alkyl groups having 1 to 20 carbon atoms
- mixtures thereof.

A subject of the invention is a method for separating hafnium tetrachloride and zirconium tetrachloride, comprising the following steps:
  bringing into contact under anhydrous conditions:
    a mixture of Zr tetrachloride/aromatic compound and Hf tetrachloride/aromatic compound complexes with an ionic liquid, the melting point of which is below 100° C.,
    the Zr tetrachloride/aromatic compound complex being molecular, and the Hf tetrachloride/aromatic compound complex being ionic,
  recovery of the Zr tetrachloride/aromatic compound complex in a solvent, said solvent being such that:
    either the abovementioned mixture of complexes is in solution in said solvent,
    or said solvent is added to the mixture of complexes at the same time as the ionic liquid is brought into contact with the abovementioned mixture of complexes, or it is added to the mixture of complexes after the ionic liquid is brought into contact with the abovementioned mixture of complexes.

According to an advantageous embodiment of the method of the invention, the mixture of Zr tetrachloride/aromatic compound and Hf tetrachloride/aromatic compound complexes is contained in the solvent before it is brought into contact with the ionic liquid. It is possible to envisage not evaporating the solvent off after the synthesis of the organometallic compounds, since it is this solvent which can be used subsequently in the liquid-liquid extraction.

According to another advantageous embodiment of the method of the invention, the solvent is added to the mixture of complexes at the same time as the ionic liquid is brought into contact with the mixture of complexes.

According to another advantageous embodiment of the method of the invention, the solvent is added to the mixture of complexes after the ionic liquid is brought into contact with the mixture of complexes.

According to another advantageous embodiment of the method of the invention, the latter comprises the following steps:
  bringing into contact under anhydrous conditions:
    a mixture of Zr tetrachloride/aromatic compound and Hf tetrachloride/aromatic compound complexes with an ionic liquid,
    the Zr tetrachloride/aromatic compound complex being molecular, and the Hf tetrachloride/aromatic compound complex being ionic,
      if the mixture of complexes contains no solvent, the addition of a solvent at the end of the previous step,
  in order to obtain an anhydrous reaction mixture such that:
  if the ionic liquid is not miscible with the solvent, the abovementioned mixture contains a phase comprising the solvent and a phase comprising the ionic liquid,
  and if the ionic liquid is miscible with the solvent, the abovementioned mixture contains an added alkane allowing the formation of a phase comprising the solvent and a phase comprising the ionic liquid,
  and in this way to carry out a liquid-liquid extraction,
  recovering the ionic Hf tetrachloride/aromatic compound complex solubilized in the ionic liquid, and that of the molecular Zr tetrachloride/aromatic compound in the solvent complex.

According to another advantageous embodiment of the method of the invention, recovery of the molecular Zr tetrachloride/aromatic compound complex from the solvent is carried out by decantation between the phase comprising the solvent and the phase comprising the ionic liquid, when these two phases are not miscible with each other.

According to another advantageous embodiment of the method of the invention, recovery of the molecular Zr tetrachloride/aromatic compound complex in the solvent is carried out by the addition of an alkane, in particular butane, pentane, making it possible to obtain the phase comprising the solvent and the phase comprising the ionic liquid.

The liquid-liquid extraction according to the invention can be carried out in a discontinuous manner; thus a portion of the mixture of Zr tetrachloride/aromatic compound and Hf tetrachloride/aromatic compound complexes is brought into contact with a certain volume of ionic liquid and hydrocarbons. After stirring it is ensured that two phases have indeed formed, an essential condition for the extraction. If not it is necessary to modify the composition of at least one of the liquids. Thus the aromatic hydrocarbons are often miscible with the ionic liquids which makes it necessary to add alkane.

According to another advantageous embodiment of the method of the invention, the step of bringing the mixture of Zr tetrachloride/aromatic compound and Hf tetrachloride/aromatic compound complexes into contact with the ionic liquid is preceded by a step of treating hafnium tetrachloride and zirconium tetrachloride with an aromatic compound in order to obtain the mixture of Zr tetrachloride/aromatic compound and Hf tetrachloride/aromatic compound complexes.

According to another advantageous embodiment of the method of the invention, the latter comprises a step of removal of the aromatic compound from said complexes.

The step of removal of the aromatic compound can be carried out by vacuum distillation.

The step of removal of the aromatic compound can be carried out by vacuum distillation in the presence of an alkane.

According to another advantageous embodiment of the method of the invention, said aromatic has the following formula:

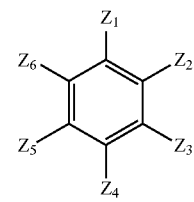

in which $Z_1$, $Z_2$, $Z_3$, $Z_4$, $Z_5$ and $Z_6$ represent independently of each other:
  a hydrogen atom, or
  an alkyl containing from 1 to 12 carbon atoms, or
  an aryl.

According to another advantageous embodiment of the method of the invention, said ionic liquid is a mixture, in particular stoichiometric, of one or more ammonium chlorides and one or more metal chlorides.

According to another advantageous embodiment of the method of the invention, the metal chloride or chlorides in the ionic liquid are chosen from aluminium trichloride, zinc chloride, zirconium tetrachloride, hafnium tetrachloride, ferrous chloride, ferric chloride, boron trichloride, gallium trichloride, cupric chloride, cuprous chloride, titanium tetrachloride, cadmium trichloride, cobalt dichloride, tin dichloride, tin tetrachloride, antimony trichloride or mixtures thereof.

According to another advantageous embodiment of the method of the invention, the ammonium chloride or chlorides in the ionic liquid are chosen from:
- the compounds corresponding to general formula NR1R2R3+Cl−, R1, R2, and R3 being linear or branched aliphatic groups having 1 to 20 carbon atoms
- the cycloalkanes with 5 to 12 carbon atoms or aromatics,
- the heterocyclic chlorides such as pyridine and the substituted pyridines,
- the dipyridyls,
- the mono-, di- or trisubstituted imidazolium chlorides,
- the benzimidazoliums and substituted benzimidazoliums,
- the triazoliums and substituted triazoliums,
- the piperadiziniums and substituted piperadiziniums,
- the pyrrolidiniums and substituted pyrrolidiniums,
- the oxazolidiniums and substituted oxazolidiniums,
- the morpholiniums and substituted morpholiniums,
- the guanidiniums and substituted guanidiniums,
- the thiazoliums and substituted thiazoliums,
- the phosphonium chlorides and substituted phosphonium chlorides,
- any other nitrogen- or phosphorus-containing heterocycle optionally also containing oxygen or sulphur atoms, and mixtures thereof.

According to another advantageous embodiment of the method of the invention, the ionic liquid is a stoichiometric mixture of methylbutylimidazolium chloride and aluminium chloride.

According to another advantageous embodiment of the method of the invention, the solvent is a hydrocarbon or a mixture of hydrocarbons in particular chosen from:
- linear or branched alkanes with 1 to 20 carbon atoms,
- C5-C12 cycloalkanes and substituted cycloalkanes,
- aromatics substituted by alkyl and/or cycloalkyl chains, the alkyl groups having from 1 to 20 carbon atoms and mixtures thereof.

According to another advantageous embodiment of the method of the invention, the liquid-liquid extraction is carried out in a discontinuous manner.

It is also possible to envisage several washings of the ionic liquid with hydrocarbons in discontinuous mode, in order to increase the yield of the liquid-liquid extraction.

Said liquid-liquid extraction can be carried out in a continuous counter-current manner. If the performance desired for the extraction is not sufficient it is possible to add the number of steps necessary to obtain the desired degree of separation.

A particular subject of the invention is a method as described above comprising the following steps:
- treatment of a mixture of hafnium tetrachloride and zirconium tetrachloride with hexamethylbenzene in solution in toluene over 48 hours at ambient temperature with stirring in order to obtain a mixture of Zr tetrachloride/aromatic compound and Hf tetrachloride/aromatic compound complexes in solution in toluene,
- cooling down of the solution obtained in the previous step to 4° C.,
- recovery of the solid form in the previous step,
- evaporation of the toluene in order to obtain a mixture of complexes,
- dissolution of the mixture of complexes in a stoichiometric mixture of methylbutylimidazolium chloride and aluminium chloride, and the addition of toluene in order to obtain a reaction mixture,
- addition of pentane to the reaction mixture to form two phases,
- separation of the two phases by decantation and recovery of the ionic complex Hf tetrachloride/aromatic compound and the molecular complex Zr tetrachloride/aromatic compound.

Once the separation of the Zr tetrachloride/aromatic compound and Hf tetrachloride/aromatic compound complexes has been carried out, it is necessary to disengage the zirconium and hafnium tetrachlorides by removal of the aromatic compound. For this, the compounds are heated under vacuum up to distillation of said aromatic hydrocarbon which can also be facilitated by entrainment by an alkane, for example dodecane in the case of hexamethylbenzene or heptane in the case of xylenes.

It will be appreciated that the invention illustrated by the examples uses a mixture prepared on the one hand from $ZrCl_4$ and on the other hand from $HfCl_4$, which is equivalent to the use of a pre-existing mixture, such as those that are obtained starting from the treatment of zircon ore.

BRIEF DESCRIPTION OF THE DRAWING FIGURES

FIG. 1 represents an assembly intended for the extraction from the ionic liquid containing the mixture of Zr tetrachloride/aromatic compound-Hf tetrachloride/aromatic compound complexes by toluene.

DETAILED DESCRIPTION OF THE INVENTION

EXAMPLES

Example 1

In Situ Preparation of the Mixture of Complexes: Zr Tetrachloride/Hexamethylbenzene-Hf Tetrachloride/Hexamethylbenzene 0.818 g (4.04 mmol) of hexamethylbenzene is dissolved in 100 mL of toluene. 1.38 g (5.92 mmol) of zirconium tetrachloride and 1.78 g (5.56 mmol) of hafnium tetrachloride are added to this solution. After stiffing for 48 hours, the solution is cooled down to 4° C. The solid formed is recovered and the toluene is evaporated off.

Example 2

Preparation of a Complex: Hafnium Tetrachloride/Tetramethylbenzene 0.33 g (2.46 mmol) of tetramethylbenzene is dissolved in 50 mL of toluene. 1.76 g (5.50 mmol) of hafnium tetrachloride is added using a Bush tube.

The solution very rapidly takes on a canary yellow colour. The solution is placed under vigorous stirring and at ambient temperature for 48 hours.

After 48 hours, a yellow solid is deposited on the walls of the Schlenk tube and the toluene is slightly yellow. The mixture is placed at 4° C. for 24 hours. The solvent is cannulated, then the solid is dried for 48 hours under $10^{-2}$ mmHg.

Example 3

Preparation of a Complex: Zirconium Tetrachloride/Tetramethylbenzene 0.71 g (5.29 mmol) of tetramethylbenzene is dissolved in 80 mL of toluene. 2.49 g (10.69 mmol) of zirconium tetrachloride is added using a Bush tube.

The solution, which gradually becomes yellow in colour, is left under stiffing and at ambient temperature for 48 hours.

After 48 hours, a lemon yellow solution is obtained, as well as an extremely fine white solid. The solution is cooled down to 4° C. for 24 hours. The solvent is cannulated, then the solid dried for 48 hours under $10^{-2}$ mmHg.

Example 4

In Situ Preparation of a Mixture of Complexes: 0.7 Mole Zr Tetrachloride/–0.3 Mole of Hf Tetrachloride/1 Mole of Tetramethylbenzene 5.010 g (37.25 mmol) of tetramethylbenzene is dissolved in 50 mL of toluene. 6.080 g (26.08 mmol) of zirconium tetrachloride and 3.580 g (11.18 mmol) of hafnium tetrachloride are added using a Bush tube. The solution, which rapidly takes on a milky yellow colour, is left under vigorous stirring and at ambient temperature for 48 hours.

After stirring for 48 hours, the yellow solution, is filtered using a tube provided with a frit (pores: size 3). The cloudy yellow toluene solution, and the yellowish white solid are retained then analyzed by ICP spectroscopy and X-ray fluorescence.

Example 5

In Situ Preparation of a Mixture of 0.9 Mole of Zr Tetrachloride/0.1 Mole of Hf Tetrachloride/1 Mole of Tetramethylbenzene Complexes 5.008 g (37.25 mmol) of tetramethylbenzene is dissolved in 50 mL of toluene. 7.810 g (33.53 mmol) of zirconium tetrachloride and 1.190 g (3.725 mmol) of hafnium tetrachloride are added using a Bush tube.

The solution, which rapidly takes on a milky yellow colour, is left under vigorous stirring and at ambient temperature for 48 hours.

After stirring for 48 hours, the solution, which is deep yellow, is filtered using a tube provided with a frit (pores: size 3).

The cloudy yellow toluene solution, and the yellowish white solid, are retained then analyzed by ICP spectroscopy and X-ray fluorescence.

Example 6

Preparation of the Ionic Liquid [1-butyl-3-methylimidazolium]$AlCl_4$ 16.61 g (95.1 mmol) of methylbutylimidazolium chloride is heated to 65° C. in a flask. 12.68 g (95.1 mmol) of aluminium chloride is added to it followed by stirring overnight. A viscous, colourless liquid is obtained.

Example 7

Preparation of the Iconic Liquid [1-butyl-3-methylimidazolium]$AlCl_4$

In a round-bottomed Schlenk tube, 20.00 g (113.3 mmol) of 1-butyl-3-methylimidazolium chloride is heated to 70° C.; at this temperature, the salt is liquid. Using a Bush tube 15.28 g (114.7 mmol) of aluminium trichloride is added under an argon flow to the liquid salt and under vigorous stirring. The transparent and clear solution is left at 70° C. and under stirring for 24 hours. A slightly yellow, clear, viscous liquid is obtained.

Example 8

Preparation of the Iconic Liquid [1-butyl-3-methylimidazolium]$ZnCl_3$

In a round-bottomed Schlenk tube, 2.00 g of 1-butyl-3-methylimidazolium (11.46 mmol) is heated to 70° C. under a flow of argon. 1.56 g of anhydrous zinc dichloride (11.45 mmol) is added to this mixture very slowly and under constant stiffing, over approximately 1 hour. The heating was continued for 1 hour, before whitish and very viscous liquids are obtained.

NMR $^1$H (CD$_3$CN, δ): 8.63 (s, H$_2$), 7.37 (d, H$_{4,5}$), 4.15 (t, H$_7$), 3.84 (s, H$_6$), 1.80 (m, H$_8$), 1.29 (m, H$_9$), 0.91 (t, H$_{10}$). NMR $^{13}$C (CD$_3$CN, δ): 136.1 (C$_2$), 123.6 (C$_5$), 122.2 (C$_4$), 49.3 (C$_7$), 36.0 (C$_6$), 31.6 (C$_8$), 19.0 (C$_9$), 12.7 (C$_{10}$). MS (m/z of the highest peak). ESI$^+$: 139.1 ([BMIm]$^+$, 24%), 312.9 ([2BMIm, Cl]$^+$, 9%), 448.5 ([2 BMIm, ZnCl$_3$]$^+$, 2%), 622.8 ([3 BMIm, ZnCl$_4$]$^+$, 100%), 758.5 ([3 BMIm, 2ZnCl$_3$]$^+$, 26). ESI$^-$: 170.9 [ZnCl$_3$]$^-$, 100%), 482.6 ([BMIm, 2 ZnCl$_3$]$^-$, 24%).

Example 9

Preparation of the Ionic Liquid [1-butyl-3-methylimidazolium]$_2$ZrCl$_6$

In a round-bottomed Schlenk tube, 0.5 g (2.86 mmol) of 1-butyl-1-methylimidazolium chloride is heated to 70° C.; at this temperature, the salt is liquid. Using a Bush tube 0.667 g (2.86 mmol) of zirconium tetrachloride is added under an argon flow to the liquid salt and under vigorous stiffing. The clear, transparent solution is left at 70° C. and under stirring for 24 hours. A viscous liquid is obtained.

$^1$H NMR (CD$_3$CN, δ): 8.49 (1H, s, C$_2$H), 7.38 and 7.34 (2H, d, C$_{4,5}$H), 4.20 (2H, t, C$_7$H$_2$), 3.83 (3H, s, C$_6$H$_3$), 1.80 (2H, qn, C$_8$H$_2$), 1.31 (2H, sx, C$_9$H$_2$), 0.95 (3H, t, C$_{10}$H$_3$). $^{13}$C NMR (CD$_3$CN, δ): 136.83 (s, C$_2$), 124.59 and 123.21 (d, C$_{4,5}$), 50.30 (s, C$_7$), 36.98 (s, C$_6$), 32.56 (s, C$_8$), 19.91 (s, C$_9$), 13.65 (s, C$_{10}$). $^{13}$C Solid-state NMR (δ): 135.82 (C$_2$), 124.46 and 123.15 (C$_{4,5}$), 49.68 (C$_7$), 39.11 and 37.52 (C$_6$), 32.50 (C$_8$), 20.08 and 19.02 (C$_9$), 13.47 and 10.83 (C$_{10}$). ESI$^+$: 139.1 [C$_1$C$_4$Im$^+$], 312.8 [2(C$_1$C$_4$Im$^+$) Cl$^-$], 544.5 [2(C$_1$C$_4$Im$^+$) ZrCl$_5^-$], 721.0 [3(C$_1$C$_4$Im$^+$) ZrCl$_6^{2-}$], 1302.8 [5(C$_1$C$_4$Im$^+$) 2ZrCl$_6^{2-}$] ESI$^-$: 266.9 [ZrCl$_5^-$]

Example 10

Preparation of the Ionic Liquid [1-butyl-3-methylimidazolium]$_2$HfCl$_6$

In a round-bottomed Schlenk tube, 0.5 g (2.86 mmol) of 1-butyl-1-methylimidazolium chloride is heated to 70° C.; at this temperature, the salt is liquid. Using a Bush tube hafnium tetrachloride (0.916 g, 2.86 mmol) is added under an argon flow to the liquid salt and under vigorous stirring. The clear, transparent solution is left at 70° C. and under stirring for 24 hours. A viscous liquid is obtained.

$^1$H NMR (CD$_3$CN, δ): 8.52 (1H, s, C$_2$H), 7.36 and 7.31 (2H, d, C$_{4,5}$H), 4.14 (2H, t, C$_7$H$_2$), 3.81 (3H, s, C$_6$H$_3$), 1.80 (2H, qn, C$_8$H$_2$), 1.29 (2H, sx, C$_9$H$_2$), 0.90 (3H, t, C$_{10}$H$_3$). $^{13}$C NMR (CD$_3$CN, δ): 136.97 (s, C$_2$), 124.46 and 123.06 (d, C$_{4,5}$), 50.14 (s, C$_7$), 36.92 (s, C$_6$), 32.53 (s, C$_8$), 19.80 (s, C$_9$), 13.57 (s, C$_{10}$). $^{13}$C Solid-state NMR (δ): 135.59 (C$_2$), 123.22 (C$_{4,5}$), 49.73 (C$_7$), 39.34 (C$_6$), 32.41 (C$_8$), 20.04 (C$_9$), 13.36 and 10.88 (C$_{10}$). ESI$^+$: 139.1 [C$_1$C$_4$Im$^+$], 313.0 [2(C$_1$C$_4$Im$^+$) Cl$^-$], 693.8 [2(C$_1$C$_4$Im$^+$) HfCl$_5^-$], 809.0 [3(C$_1$C$_4$Im$^+$) HfCl$_6^{2-}$], 1447.8 [5(C$_1$C$_4$Im$^+$) 2HfCl$_6^{2-}$] ESI$^-$: 356.9 [HfCl$_5^-$]

Example 11

Solubility of Aromatic Compounds and/or Alkanes in Different Solvents

The relative solubilities of alkanes, aromatic compounds and aromatic compound/alkane pairs were studied in the following solvents: toluene, C$_n$H$_{2n+2}$ and ionic liquid [1-butyl-3-methylimidazolium]AlCl$_4$. The results are noted in Table 1.

TABLE 1

| | | | |
|---|---|---|---|
| Solubility of aromatic and/or alkane compounds in different solvents | | | |
| | Toluene | Alkyl chain: C$_n$H$_{2n+2}$ | Ionic liquid: C$_1$C$_4$ImAlCl$_4$ |
| C$_n$H$_{2n+2}$ with n > 6 | Completely soluble | | Solubility <4% |
| Ar(CH$_3$)$_n$ | Completely soluble | Completely soluble | n = 1 solubility 38% n > 4: insoluble |
| Ar(CH$_3$)$_n$ + C$_n$H$_{2n+2}$ | Completely soluble | Completely soluble | n = 1 solubility 8% n > 4 solubility 15% |

Example 12

Extraction of the Zirconium Tetrachloride/Hexamethylbenzene and Hafnium Tetrachloride/Hexamethylbenzene Complexes The solubilities are measured by X-ray fluorescence. Intensity: Hf (Lα) 0.5476 and Zr (Kα) 0.3731.

The mixture obtained according to Example 1 is added to the ionic liquid obtained according to Example 6, and stirred overnight. Then toluene is added and stirring is continued for a day. Then only one phase is observed. Then pentane is introduced in order to extract the toluene from the ionic liquid (Table 2).

TABLE 2

| | | |
|---|---|---|
| Quantities of complexes and solvents utilized for the extraction. | | |
| | Zr complex | Hf complex |
| Quantity of complex (mg-μmol) | 50-8.5 | 47-4.9 |
| Ionic liquid (mL) | 2 | 1 |
| Toluene (mL) | 3 | 1.5 |
| Pentane (mL) | 2 | 1 |

The extraction of the complexes from the liquid by the toluene/pentane mixture shows that approximately 13±5% of the zirconium complex is extracted whereas only a trace of the hafnium complex is found in the organic phase (Table 3).

TABLE 3

| | | |
|---|---|---|
| Separation of the Zr and the Hf | | |
| | Zr | Hf |
| Ionic liquid | 87 ± 5% | Approx. 100% |
| Organic phase | 13 ± 5% | trace Approx. 0% |

This shows that the Hafnium can be quantitatively extracted by means of single-stage equilibrium extraction and that the organic phase contains practically only zirconium.

The ionic liquids obtained in Examples 8 to 10 are used in an analogous manner in order to obtain a separation of the Zr tetrachloride/aromatic compound-Hf tetrachloride/aromatic compound complexes obtained in Examples 1 to 5 with an enrichment obtained as expected.

The invention claimed is:

1. A method for separating hafnium tetrachloride and zirconium tetrachloride, from a mixture of Zr tetrachloride/aromatic compound and Hf tetrachloride/aromatic compound complexes, comprising:
carrying out liquid-liquid extraction to separate hafnium tetrachloride and zirconium tetrachloride from a mixture of Zr tetrachloride/aromatic compound and Hf tetrachloride/aromatic compound complexes, with a Zr/Hf enrichment of at least 100/1 (expressed by mass), using an ionic liquid, the melting point of which is below 100° C., with a non-nucleophilic anion, under anhydrous conditions.

2. The method according to claim 1, in which the liquid-liquid extraction is carried out with a hydrocarbon or a mixture of hydrocarbons.

3. The method according to claim 1, in which the temperature at which said method is carried out is less than approximately 100° C.

4. The method according to claim 1, in which said aromatic compound has the following formula:

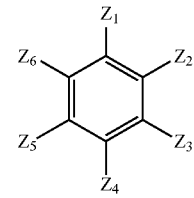

in which $Z_1$, $Z_2$, $Z_3$, $Z_4$, $Z_5$ and $Z_6$ represent independently of each other:
a hydrogen atom,
a linear or branched alkyl containing from 1 to 20 carbon atoms, or
an aryl.

5. The method according to claim 1, in which the ionic liquid is a stoichiometric mixture of methylbutylimidazolium chloride and aluminium chloride.

6. The method according to claim 2, in which the hydrocarbon is chosen from:
linear or branched alkanes with 4 to 12 carbon atoms, cycloalkanes and substituted cycloalkanes, with 5 to 12 carbon atoms,
aromatics substituted by alkyl and/or cycloalkyl chains, the alkyl radicals having 1 to 12 carbon atoms or mixtures thereof.

7. A method for separating hafnium tetrachloride and zirconium tetrachloride, comprising the following steps:
bringing into contact under anhydrous conditions:
a mixture of Zr tetrachloride/aromatic compound and Hf tetrachloride/aromatic compound complexes with an ionic liquid, the melting point of which is below 100° C.,
the Zr tetrachloride/aromatic compound complex being molecular, and the Hf tetrachloride/aromatic compound complex being ionic
recovery of the Zr tetrachloride/aromatic compound complex in a solvent, said solvent being such that:
the solvent contains the mixture of complexes,
or the solvent is added to the mixture of complexes at the same time as the ionic liquid is brought into contact with the mixture of complexes, or it is added to the mixture of complexes after the ionic liquid is brought into contact with the mixture of complexes,
in order to separate hafnium tetrachloride and zirconium tetrachloride.

8. The method according to claim 7, in which the mixture of Zr tetrachloride/aromatic compound and Hf tetrachloride/aromatic compound complexes is contained in the solvent, or in which the solvent is added to the mixture of complexes at the same time as the ionic liquid is brought into contact with the mixture of complexes.

9. The method according to claim 7, in which the solvent is added to the mixture of complexes after the ionic liquid is brought into contact with the mixture of complexes.

10. The method according to claim 7 for separating hafnium tetrachloride and zirconium tetrachloride, comprising the following steps:
bringing into contact under anhydrous conditions:
a mixture of Zr tetrachloride/aromatic compound and Hf tetrachloride/aromatic compound complexes with an ionic liquid,
the Zr tetrachloride/aromatic compound complex being molecular, and the Hf tetrachloride/aromatic compound complex being ionic,
if the mixture of complexes contains no solvent, the addition of a solvent at the end of the previous step, in order to obtain an anhydrous reaction mixture such that:
if the ionic liquid is not miscible with the solvent, the mixture contains a phase comprising the solvent and a phase comprising the ionic liquid,
and if the ionic liquid is miscible with the solvent, the mixture contains an added alkane allowing the formation of a phase comprising the solvent and a phase comprising the ionic liquid,
and thus to carry out a liquid-liquid extraction by the addition of the ionic liquid to the mixture of Zr tetrachloride/aromatic compound and Hf tetrachloride/aromatic compound complexes, and
recovery of the ionic complex: Hf tetrachloride/aromatic compound solubilized in the ionic liquid, and that of the molecular complex: Zr tetrachloride/aromatic compound in the solvent.

11. The method according to claim 7, in which recovery of the molecular complex: Zr tetrachloride/aromatic compound in the solvent is carried out by decantation between the phase comprising the solvent and the phase comprising the ionic liquid, when these two phases are not miscible with each other.

12. The method according to claim 7, in which recovery of the molecular complex Zr tetrachloride/aromatic compound in the solvent is carried out by the addition of an alkane, making it possible to obtain the phase comprising the solvent and the phase comprising the ionic liquid.

13. The method according to claim 7, in which the step of bringing the mixture of Zr tetrachloride/aromatic compound and Hf tetrachloride/aromatic compound complexes into contact with the ionic liquid is preceded by a step of treatment of the hafnium tetrachloride and the zirconium tetrachloride with an aromatic compound in order to obtain the mixture of Zr tetrachloride/aromatic compound and Hf tetrachloride/aromatic compound complexes.

14. The method according to claim 7, comprising a step of removal of the aromatic compound from said complexes by vacuum distillation or by vacuum distillation in the presence of an alkane.

15. The method according to claim 7, comprising the following steps:
treatment of a mixture of hafnium tetrachloride and zirconium tetrachloride with hexamethylbenzene in solution in toluene for 48 hours at ambient temperature with stirring in order to obtain a mixture of Zr tetrachloride/aromatic compound and Hf tetrachloride/aromatic compound complexes in solution in toluene,
cooling down the solution obtained in the previous step at 4° C. in order to obtain a solid,
recovery of the solid formed in the previous step,
evaporation of the toluene in order to obtain a mixture of complexes,
dissolution of the mixture of complexes in a stoichiometric mixture of methylbutylimidazolium chloride and aluminium chloride, and the addition of toluene in order to obtain a reaction mixture,
addition of pentane to the reaction mixture in order to form two phases,
separation of the two phases by decantation and recovery of the ionic complex Hf tetrachloride/aromatic compound and the molecular complex: Zr tetrachloride/aromatic compound.

* * * * *